Sept. 7, 1926.  
R. OPPENHEIM  
1,599,061  
DRY BATTERY OR BATTERY WITH A SOLIDIFIED ELECTROLYTE  
Filed Feb. 17, 1925
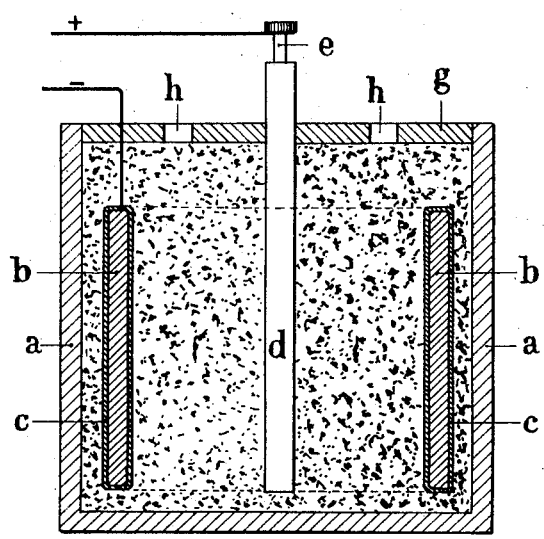
Inventor
René Oppenheim
By Marks & Clerk
Attys.

Patented Sept. 7, 1926.

1,599,061

UNITED STATES PATENT OFFICE.

RENÉ OPPENHEIM, OF LEVALLOIS-PERRET, FRANCE, ASSIGNOR TO SOCIETE ANONYME LE CARBONE, OF LEVALLOIS-PERRET, FRANCE.

DRY BATTERY OR BATTERY WITH A SOLIDIFIED ELECTROLYTE.

Application filed February 17, 1925, Serial No. 9,844, and in France February 7, 1924.

Batteries as at present known employing an electrolyte in solid form, usually called dry batteries, are generally composed of a negative electrode, a positive electrode around which is rammed or compressed the depolarizing substance, and a gelatinous solidifying agent containing the electrolyte.

The manufacture of these batteries requires a special stock of tools and very important hand labour, particularly for the agglomeration of the depolarizing material, or for ensuring its contact with the positive electrode. Furthermore the interposition of the depolarizing substance between the positive electrode and the gelatinous solidifying agent necessarily occupies a certain volume which increases the amount of space occupied by the battery.

The present invention has for its object an improvement in this type of battery with the object of simplifying its construction and reducing the amount of space occupied thereby or leaving more room for the electrolytic composition.

This improvement consists substantially in employing as the depolarizing substance, a porous powder which vigorously absorbs the outer air, and in suspending it in a colloidal solidifying agent containing the electrolyte. The paste thus obtained is run the receptacle of the battery after the two electrodes, the positive and negative ones, have been previously put in place. The battery thus constructed in a very simple manner is ready for use.

By reason of the porosity of the particles of the depolarizing substance, each of these particles withdraws from the colloidal solidifying substance, with which it is in contact, a certain number of molecules of water of constitution, in such a way that there is formed around each particle of the depolarizing substance, a pectized film which is infinitely thin and impermeable to liquids but permeable by gases. This depolarizing particle is not therefore liable to be penetrated by the moisture of the solidifying substance and therefore retains all its absorbent and catalytic properties.

Under these conditions, the gases produced during the working of the battery are immediately absorbed by these absorbent particles distributed throughout the depolarizing substance.

Furthermore, the pectization of the colloidal solidifying agent around each porous depolarizing particle produces within the interior of this colloidal solidifying substance a slight shrinkage the effect of which is to produce channels in the mass by which the outer air can reach the porous particles and keep up their depolarizing properties.

In order to prevent the battery from working when the circuit is open owing to the contact between the negative electrode and the particles of depolarizing substance in suspension, it is well to provide this electrode with a layer of paper or felt impregnated with a solution which is a good conductor of electricity and which does not attack the material of which the electrode is made.

By way of example there will now be described a manner of constructing a battery made according to the above process reference being had to the accompanying drawing which shows the battery in vertical section.

This battery is constituted in the following manner:

In a receptacle $a$ of glass, wood covered with tarred canvas, ebonite, or the like are placed a circular negative electrode $b$ of zinc covered over the whole of its surface with a jacket $c$ of absorbent paper strongly impregnated with a solution of chloride of zinc, and a positive electrode $d$ of retort carbon provided at its upper part with a terminal $e$.

Into the interior of the receptacle $a$ is run the gelatinous mass $f$ containing the electrolyte and the depolarizer.

This mass may be obtained in the following manner:

About two kilogrammes of fecula are dissolved in three litres of water and eight kilogrammes of ammonium chloride are dissolved in twenty five litres of water, raised to a temperature of from 80 to 90 degrees centigrade. The two solutions are then mixed, a small proportion of hygroscopic salts intended to prevent evaporation of the water being added if necessary. The mass is allowed to cool down to about 30 degrees centigrade and the viscous liquid thus obtained is poured on to about eighteen kilogrammes of wood charcoal in fine powder.

There is thus obtained after prolonged kneading, a very compact paste ready to be run into the receptacle *a* of the battery as above described.

The receptacle *a* is finally closed at its upper part by an insulating layer of wax *g* pierced with one, two or more holes *h* which permit the access of air to the interior of the battery.

It is obvious that the method of manufacture above described is given by way of example only and that the shape, the dimensions and the nature of the materials employed may vary according to the use for which they are required.

Claims:—

1. A dry battery comprising a negative electrode, a positive electrode, an intimate mixture of porous powdered depolarizing material, and immobilizing colloidal pectizable material containing the electrolyte.

2. A dry battery comprising a negative electrode, a positive electrode, an intimate mixture of porous powdered wood carbon, an immobilizing colloidal pectizable material containing the electrolyte.

3. A dry battery comprising a zinc negative electrode, a carbon positive electrode, and an electrolytic depolarizing mass comprising a coagulum of flour containing a solution of ammonium chloride and a suspension of powdered wood carbon.

The foregoing specification of my "improvements in dry batteries or batteries with a solidified electrolyte", signed by me this 4th day of February 1925.

RENÉ OPPENHEIM.